United States Patent
Miyahira

(10) Patent No.: US 7,353,268 B2
(45) Date of Patent: Apr. 1, 2008

(54) NETWORK SYSTEM, SERVER, WEB SERVER, WEB PAGE, DATA PROCESSING METHOD, STORAGE MEDIUM, AND PROGRAM TRANSMISSION APPARATUS

(75) Inventor: Tomohiro Miyahira, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1528 days.

(21) Appl. No.: 09/812,438

(22) Filed: Mar. 20, 2001

(65) Prior Publication Data

US 2001/0054086 A1 Dec. 20, 2001

(30) Foreign Application Priority Data

Jun. 1, 2000 (JP) ............................. 2000-164351

(51) Int. Cl.
*G06F 17/00* (2006.01)
(52) U.S. Cl. ...................... 709/224; 709/220; 709/228; 707/4; 707/201
(58) Field of Classification Search ................ 709/203, 709/218, 224, 228, 232, 220, 227; 370/389; 705/14, 15; 707/4, 10, 201, 206
See application file for complete search history.

(56) References Cited

U.S. PATENT DOCUMENTS

| | | | | |
|---|---|---|---|---|
| 5,987,454 | A * | 11/1999 | Hobbs | 707/4 |
| 6,006,242 | A * | 12/1999 | Poole et al. | 715/531 |
| 6,205,432 | B1 * | 3/2001 | Gabbard et al. | 705/14 |
| 6,205,472 | B1 * | 3/2001 | Gilmour | 709/206 |
| 6,366,956 | B1 * | 4/2002 | Krishnan | 709/223 |
| 6,436,264 | B1 * | 8/2002 | Tamura | 204/634 |
| 6,523,022 | B1 * | 2/2003 | Hobbs | 707/3 |

FOREIGN PATENT DOCUMENTS

JP PUPA 11-242639 9/1999

OTHER PUBLICATIONS

Hideki Yamamoto, "Practical Systems Using Machine Translation", Mar. 1, 1998, Journal of Japanese Soc. Of Artificial Intelligence, vol. 13, No. 2 p. 197-204.
"Net Surfer/ej Ver. 3.0 for Windows 95", Hello! PC vol. 4, No. 14, p. 215.
Sakura, Don't Ask About Platform, GPS Running On Your favorite PC, Russel Pubishing, vol. 7, Nov. 1 58~61 Published Jan. 1, 1999.

* cited by examiner

*Primary Examiner*—Khanh Dinh
(74) *Attorney, Agent, or Firm*—Ido Tuchman; Anne Dougherty

(57) ABSTRACT

A network system includes a client for browsing a web page, a conversion server for providing a function for performing a predetermined process for the web page, and a web server for storing the web page that includes a function button used to request that a process be performed by the conversion server, wherein the client obtains the web page and selects the function button, the client designates the storage location for the target web page and transmits a process execution request to the conversion server, wherein the conversion server obtains the target web page based on the storage location that is designated by the process execution request, performs a pertinent process for the target web page that is obtained, and returns the resultant web page to the client that issued the process execution request.

16 Claims, 8 Drawing Sheets

Fig. 6

Script (example) of conversion request button

```
<P><SCRIPT language="JavaScript">
<!--
function GO(){location.href = "http://conversion.ibm.com/cgi-bin/convert?f=ej&u=" + location;}
//-->
</SCRIPT></P>
<P align="right">
<A HREF="JavaScript:GO();">[Machine Translation E->J]</A>
</P>
```

On the third line,
http://conversion.ibm.com is a server name
cgi-bin is a directory name
convert is a program (cgi program) name
f=ej and u=" +location ; are descriptions of options (referred to by a program)

NETWORK SYSTEM, SERVER, WEB SERVER, WEB PAGE, DATA PROCESSING METHOD, STORAGE MEDIUM, AND PROGRAM TRANSMISSION APPARATUS

FIELD OF THE INVENTION

The present invention relates to a system that makes the browsing of web pages more convenient by providing functions, such as the translation of text, for converting the contents of the pages.

BACKGROUND OF THE INVENTION

Since communication networks, such as the Internet, for which web pages are used for the exchange of data, have become popular, there has been a constantly increasing demand for functions that can ensure more convenient web page browsing. These types of functions could be, for example, a translation function for translating written text on a web page, an audible reading function for the audible, voiced output of text, or a phonetic kana transcription function for positioning phonetic kana transcriptions alongside portions of Chinese character text on a Japanese web page.

To carry out these functions, means is available for employing a program that provides a relevant function, or there are service sites that provide services using specified functions. For example, for the translation function, various machine translation programs are available on the market, and there is a web site that, in response to a request from a web browser, translates a desired web page and returns the translation to the web browser.

An example web site that provides a translation service is AltaVista (http://www.altavista.com/), which also provides a web search service. When a search is performed by AltaVista, a language link [Translate] is displayed together with destination links on the list of search results. When, thereafter, a destination link is clicked on, the program jumps to a target web page. But when [Translate] is selected by clicking on it, the program jumps to the web page provided for a translation CGI (Common Gateway Interface). The CGI for web page translation includes a function for translating the web page of a URL that has been input. When the program jumps to the web page for the translation CGI, the interface was previously in a state wherein the URL of the target web page had already been entered. Thus, to translate the target web page, the user need only click on a translation button, and does not have to enter the URL again.

The function to use the program or the service site is selected and executed by a user who is browsing web pages. A web page creator, however, may include this type of service in order to provide information for more people on his or her web page. Such a case corresponds to one wherein web pages are prepared using several languages, and web pages are linked together so that a user can go back and forth between them, or to one wherein a desired function is provided for a web page by using JavaScript or a Plug-in.

As is described above, conventionally, in order to translate or read a web page orally, a user who is browsing web pages either prepares a program that provides the desired function, or employs a service site that provides the desired function as a service. Therefore, a web page creator can not provide these functions as included services for his or her web page.

When a web page creator desires to add this type of service to his or her web page, he or she prepares a web page in several languages, or employs JavaScript or a Plug-in. However, preparing a web page in several languages or adding a desired function to a web page is not easy for anyone.

One method by which to prepare a web page in a foreign language is to employ a machine translation program. However, since presently high quality translations can not be provided by the current machine translation programs, it is not appropriate to use such a program to prepare a foreign language version of a web page.

OBJECTS OF THE INVENTION

It is, therefore, one object of the present invention to provide a function for converting a web page and to easily use a pertinent function on a web page in accordance with a request submitted by a web page creator.

It is another object of the present invention to permit a user who is browsing a web page to, via a simple operation, acquire as a service a function added to the pertinent web page.

SUMMARY OF THE INVENTION

To achieve the above objects, according to the present invention, a network system comprises: a client for browsing web pages; a server for providing a function for performing a predetermined process for the web pages; and a web server for storing a web page that includes a function execution request object which is used to request that a process be performed by the function providing server, wherein the client obtains, from the web server, the web page that includes the function execution request object, and when the function execution request object included in the web page is selected, the client designates the storage location for a target web page and transmits a process execution request to the function providing server, wherein, upon the receipt of the process execution request from the client, the function providing server obtains the target web page based on the storage location that is designated by the process execution request, performs a pertinent process for the target web page that is obtained, and returns the resultant web page to the client that issued the process execution request. The function execution request object included in the web page can be a button, a banner, a linking keyword, or image data etc.

The function providing server can have a plurality of functions to process web pages, such as the translation of the web page, the addition of audio data in order to audibly read text and the addition of phonetic kana transcriptions to Chinese characters. In this case, when issuing the process execution request, the client designates the type of process to be performed, and the function providing server performs the designated process for an obtained web page.

When the obtained web page is linked with another web page, the function providing server also obtains a web page at a linking destination and performs a process for the obtained web page. With this configuration, so long as a web page can be obtained by performing a trace beginning at a web page that includes a function execution request object, the process for the obtained web page can be performed even though a function execution request object is not available at the function providing server.

The function providing server can insert predetermined advertisement contents into the web page obtained by the process.

The insertion of advertisement contents into a web page is preferable because a person who provides a service using the function providing server can expect to receive an income from the advertisements. To determine the contents of an advertisement to be added to a web page, the type of a process that has been performed for a target web page by the function providing server and the contents of the target web page can be referred to, so that an effective advertisement can be prepared.

According to the present invention, a server, for receiving an execution request from a client and for performing a predetermined function in consonance with the execution request, comprises: a command analyzer for, in response to the selection of a function execution request object that is included in a web page displayed by the client and that is used to request that the server execute a process, accepting and analyzing an execution request that is received by the server and that includes information concerning a storage location for a target web page that is to be processed; a web page acquisition unit for obtaining the target web page based on the information that is included in the execution request concerning the storage location for the target web page; and a web page converter for performing a predetermined conversion process for the target web page that is obtained. The server further comprises: a transmission unit for returning, to the client, the resultant web page obtained by the performance of the conversion process.

According to the present invention, a storage medium can be provided on which reading means for a computer stores a computer-readable program used to control a computer when the operation of the above server is implemented. This configuration is preferable because, upon the receipt of an execution request from the client, the computer in which the program is installed can be employed as a server for processing a data file.

When the obtained web page is linked with another web page, the web page acquisition unit can also obtain a web page at a linking destination, and the web page converter performs the predetermined conversion process for the web page at the linking destination that is obtained by the web page acquisition unit.

The server further comprises an advertisement insertion unit for inserting predetermined advertisement contents into the data file obtained by the web page converter. The advertisement insertion unit can select for insertion an advertisement content type based on the type of processing that the web page converter performs for the data file or on a keyword that is extracted from the data file.

Furthermore, according to the present invention, a web server, for storing a web page that is browsed by means of a communication network, comprises: storage means for storing a web page, including both a description of a URL for a function providing server, which performs a predetermined process for a web page, and a description of an option for obtaining a URL for a web page itself that this description is inserted into; and communication control means for accepting a request to browse a web page and for returning the web page to the source that transmitted the request.

According to the present invention, the web page that can be provided comprises: a first script, for displaying an execution function request object on a web page; and a second script, performed in response to the selection of the function execution request object on the web page, which is displayed by predetermined display means, for obtaining the URL of the web page and for transmitting the URL to a function providing server that has been registered in advance. Therefore, when a predetermined client displays the web page using the browser and selects the function execution request object thereon, the client can request that the server perform the process for the web page.

According to the present invention, a storage medium can be provided on which the first and the second scripts are stored and can be read by a computer. Further, according to the present invention, a program transmission apparatus can also be provided that comprises: storage means for storing the first and the second scripts; and transmission means for reading the program from the storage means and transmitting the program.

This configuration is preferable because, when a web page creator inserts the script into the source for his or her web page, the server can easily perform the processing for the web page.

According to the present invention, a data processing method for receiving an execution request from a client and for performing a predetermined process in consonance with the execution request comprises the steps of: analyzing, in response to the selection of a function execution request object that is included in a web page displayed by the client and that is used to request that the server execute a process, an execution request that is received by the server and that includes information concerning a storage location for a target web page that is to be processed; obtaining the target web page based on the information, which is included in the execution request, concerning the storage location for the target web page; and performing a predetermined conversion process for the target web page that is obtained.

According to the present invention, a storage medium can be provided on which reading means for a computer stores a computer-readable program that controls the computer which functions as the server.

BRIEF DESCRIPTION OF THE DRAWINGS

FIG. 6 is a diagram showing an example script that, in accordance with the embodiment, implements a function button that is provided for a web page.

DETAILED DESCRIPTION OF A PREFERRED EMBODIMENT

A preferred embodiment of the present invention will now be described in detail while referring to the accompanying drawings.

Figure 1:
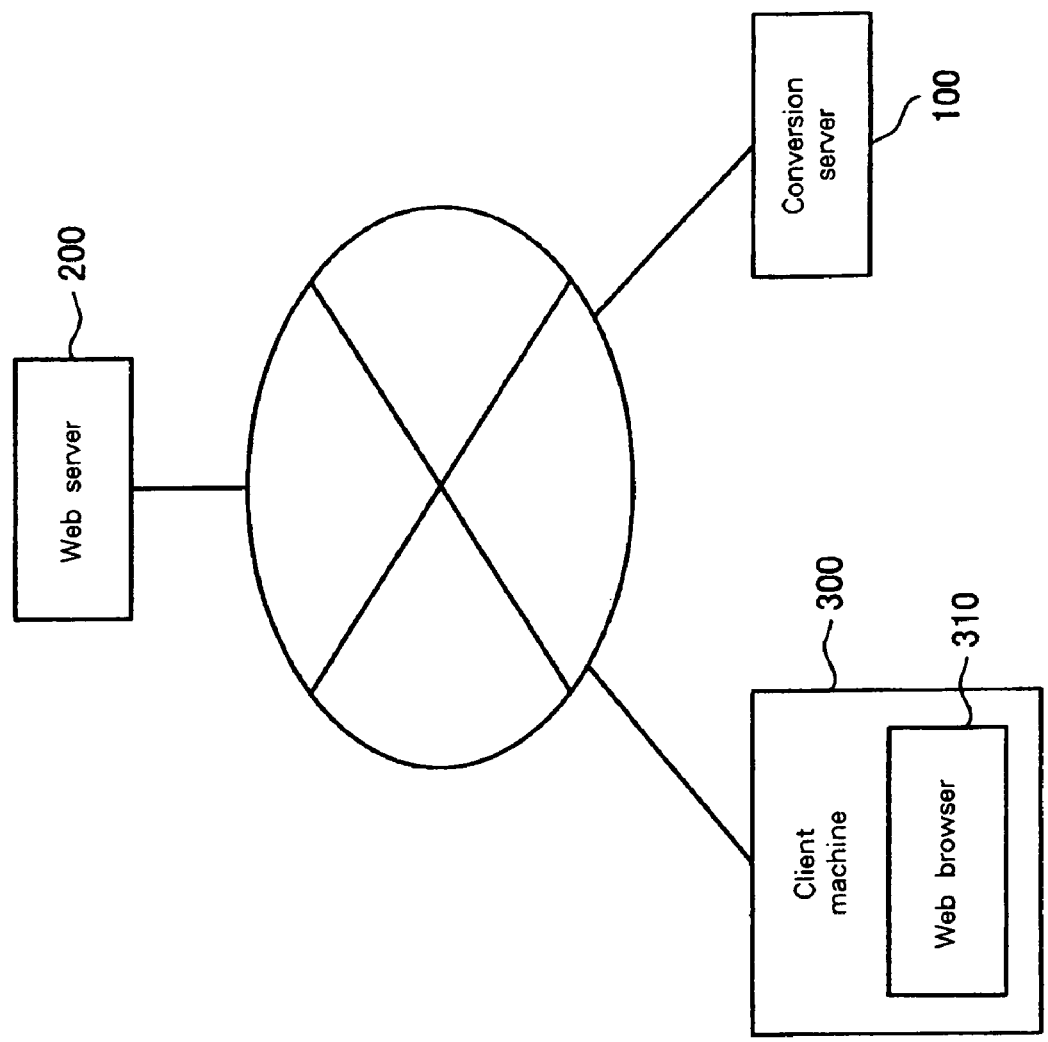
FIG. 1 is a diagram for explaining the general arrangement of a network system for providing a conversion service in accordance with an embodiment of the present invention.

FIG. 1 is a diagram for explaining the general configuration of a network system according to the embodiment for providing a conversion service.

In FIG. 1, a conversion server 100 includes various web page functions, such as translation or the audible reading of text constituting the contents of a web page and the addition of a phonetic kana transcription for Japanese text. An ordinary web server 200 includes storage means, for storing a web page, and communication control means, for receiving a web page browsing request, via a communication network, and for returning the relevant web page. A client machine 300 also incorporates a web browser 310, for browsing a web page that is stored in the web server 200. The client machine 300 can be, for example, a computer system, such as a personal computer or a workstation; one of various types of electric home appliances, such as a television incorporating a computer; a game machine having a communication function; or an information communication terminal, such as a PDA (Personal Digital Assistant). The conversion server 100, the web server 200 and the client machine 300 are interconnected using a communication network, such as the Internet, that can cope with a web page.

In this embodiment, a network system that can cope with a web page is employed. However, the present invention can also be applied for a network that can handle a file for a data form that is used both for data and for a display image that a source employs to represent the included data.

Figure 2:
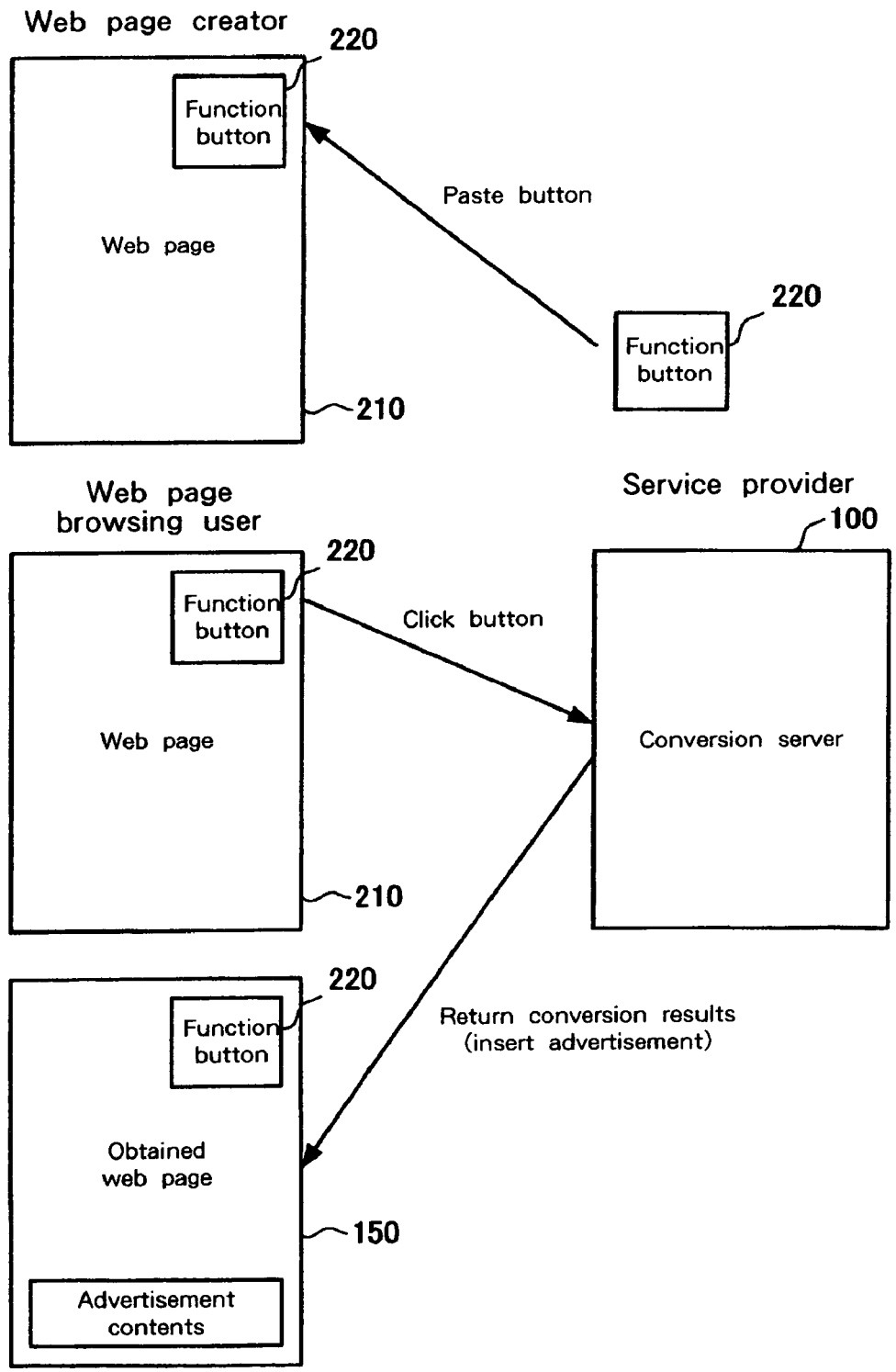
FIG. 2 is a diagram for explaining the concept of the conversion service provided for the embodiment.

FIG. 2 is a diagram for explaining the concept of the conversion service provided in this embodiment.

In FIG. 2, a web page creator pastes, on his or her web page 210, a function button 220, for using one of the functions provided by the conversion server 100, and stores the web page 210, on which the function button 220 is pasted, in a web server 200. The provider for the function button 220 may be identical to or may differ from the provider for the conversion server 100. The method employed to carry out the function for which the function button 220 is provided will be described later. In this embodiment, an explanation will be given for a case wherein a function button 220 is pasted on the web page 210 as a function execution request object; however, instead of the function button 220, a banner, a linking keyword or image data etc. may be pasted on the web page.

When a user employs the web browser 310 to display and browse the web page 210 in a window on the display device of the client machine 300, and clicks on a function button 220 pasted on the web page 210, a conversion request is issued to the conversion server 100. Upon the receipt of the request, the conversion server 100 changes the web page 210 by using the function corresponding to the function button 220. A thus obtained web page 150 is subsequently transmitted to the client machine 300. After the conversion of the web page 210, the conversion server 100 can add a predetermined advertisement to the obtained web page 150.

Figure 3:
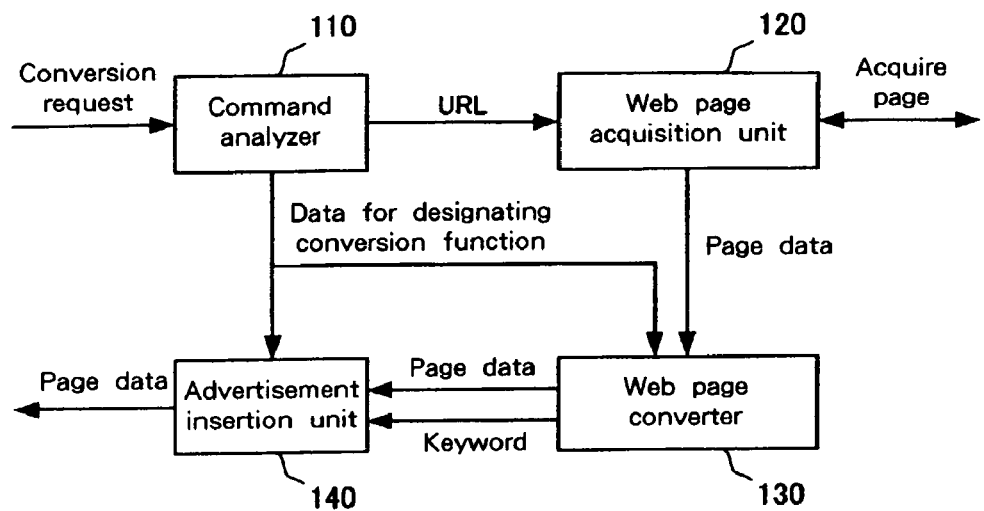
FIG. 3 is a diagram for explaining the arrangement of a conversion server in accordance with the embodiment.

FIG. 3 is a diagram for explaining the configuration of the conversion server 100. The conversion server 100, which is a computer server that provides functions, including functions for processing the web page 210, is constituted by a CGI program operating on a specific server, or by a proxy server. In the following explanation, as an example, the conversion server 100 is constituted by a CGI program.

In FIG. 3, the conversion server 100 comprises: a command analyzer 110, for receiving and for analyzing a conversion request issued by the client machine 300 when a function button 220 is clicked on; a web page acquisition unit 120, for employing the analyzation results obtained by the command analyzer 110 to obtain a data file for the web page 210; a web page converter 130, for changing the contents of the web page 210; and an advertisement insertion unit 140, for adding an advertisement to the obtained web page 150.

Using this configuration, the command analyzer 110 analyzes a conversion request received from the client machine 300. As will be described in detail later, the conversion request includes data used to designate a conversion function and the URL of the web page 210 to be converted. The command analyzer 110 separates the conversion request into data used to designate the conversion function and the URL of the target web page 210, and thereafter transmits the URL to the web page acquisition unit 120 and the data used to designate the conversion function to the web page converter 130 and the advertisement insertion unit 140.

The web page acquisition unit 120 employs the URL received from the command analyzer 110 to obtain page data that constitutes the data file for the web page 210. Thus, the conversion server 100 obtains the same web page 210 as is displayed in the web browser 310 window by the client machine 300 from which the conversion request was received. The page data for the obtained web page 210 are transmitted to the web page converter 130.

The web page converter 130 changes the web page 210 based on the conversion function data that are received from the command analyzer 110, and the page data that are received from the web page acquisition unit 120.

Figure 4:
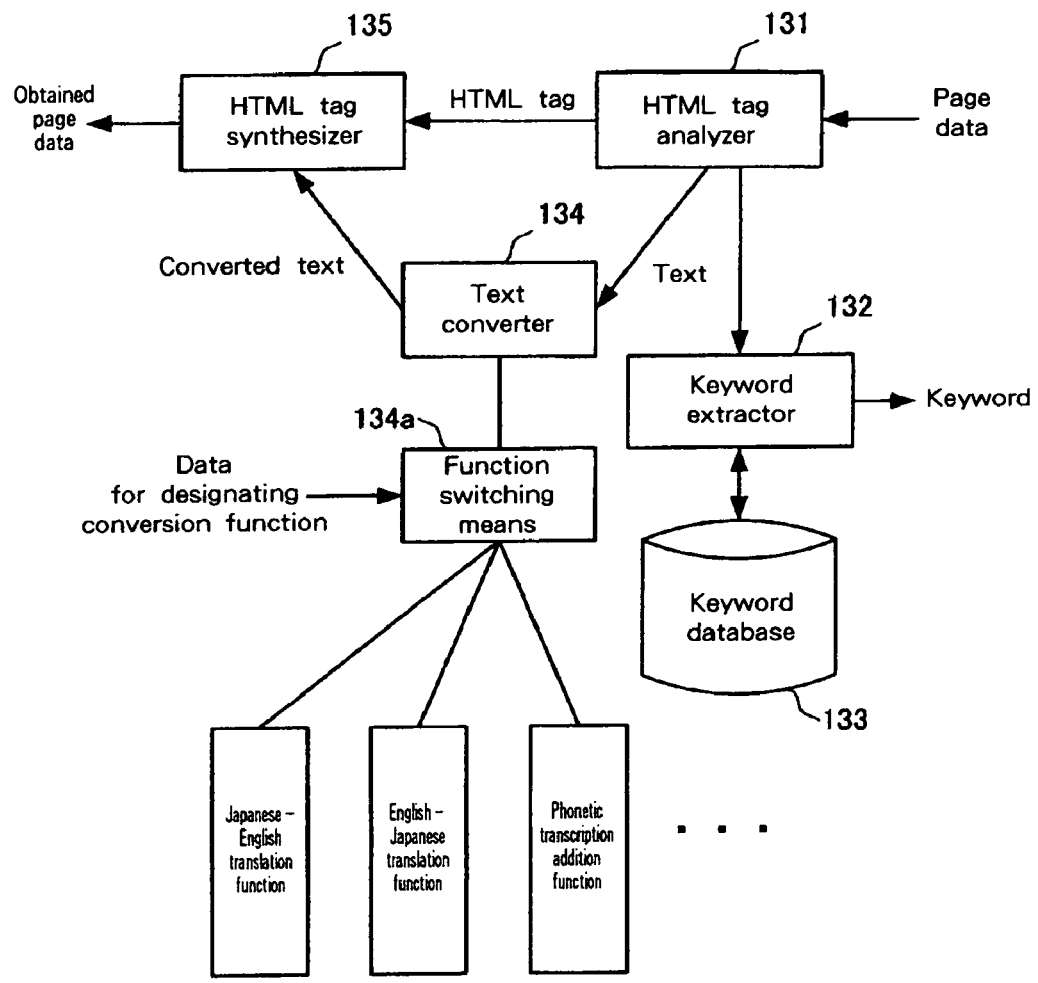
FIG. 4 is a diagram for explaining the arrangement of a web page converter in accordance with the embodiment.

FIG. 4 is a diagram for explaining the configuration of the web page converter 130.

In FIG. 4, the web page converter 130 includes an HTML tag analyzer 131, a keyword extractor 132, a keyword database 133, a text converter 134, and an HTML tag synthesizer 135.

The HTML tag analyzer 131 separates the page data, for the web page 210, that are received from the web page acquisition unit 120 into an HTML tag and text. The HTML tag analyzer 131 thereafter transmits the HTML tag to the HTML tag synthesizer 135, and the text to the keyword extractor 132 and the text converter 134.

The keyword extractor 132 employs a keyword database 133 to analyze the text of the web page 210, which was received from the HTML tag analyzer 131, and to extract a keyword that is then transmitted to an advertisement insertion unit 140.

The text converter 134 has a function for converting the text for the web page 210 that was received from the HTML tag analyzer 131. In the example in FIG. 4, the text converter 134 has a Japanese-English translation function used for the translation of Japanese text to English; an English-Japanese translation function for the translation of English text to Japanese; and a phonetic kana transcription addition function for writing phonetic kana transcriptions alongside Chinese characters entered in Japanese text. The individual functions given here are merely example text converter 134 functions, and various other functions, such as an audible reading function, for adding voice data to corresponding text, can be employed. Furthermore, the text converter 134 also includes function switching means 134a for altering a conversion function that is used. Text is converted using a function designated by data employed for the transmission of the conversion function designation, and the obtained text is transmitted to the HTML tag synthesizer 135.

The HTML tag synthesizer 135 synthesizes the HTML tag received from the HTML tag analyzer 131 with the text received from the text converter 134, and generates page data for the resultant web page 150. The page data are then transmitted to the advertisement insertion unit 140.

The advertisement insertion unit 140 receives the conversion function designation data from the command analyzer 110, the keyword from the keyword extractor 132 of the web page converter 130, and the page data for the web page 150 from the HTML tag synthesizer 135, and inserts the advertisement contents therein so that the advertisement will be positioned at an appropriate location on the web page 150. Since an advertisement need not always be added to the web page 150 in this embodiment, the advertisement insertion unit 140 is not a requisite component. However, as will be described later, an effective advertisement that a user finds interesting can be provided by using the function designation data, which are extracted by the command analyzer 110, and the keyword, which is extracted by the keyword extractor 132 of the web page converter 130, so that the provision of the advertisement insertion unit 140 is very meaningful. Further, it is preferable that an advertisement be added to a web page because then the provider of the conversion server 100 can expect to receive income from the advertisement.

Figure 5:
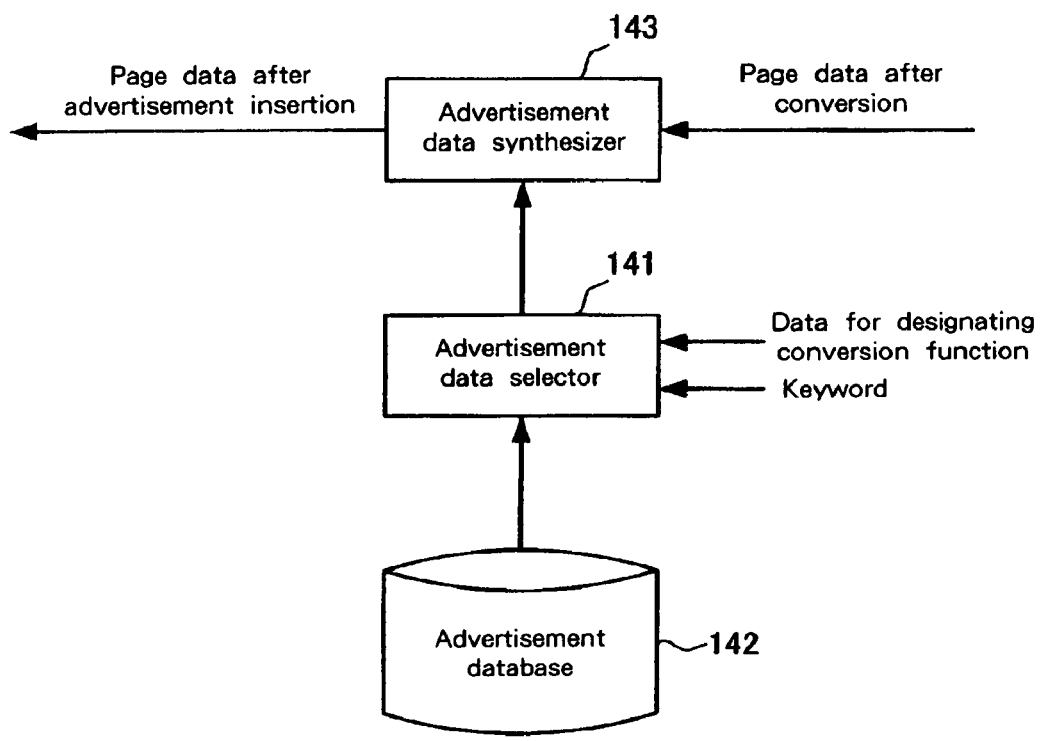
FIG. 5 is a diagram for explaining the arrangement of an advertisement insertion unit in accordance with the embodiment.

FIG. 5 is a diagram for explaining the arrangement of the advertisement insertion unit 140.

In FIG. 5, the advertisement insertion unit 140 includes an advertisement data selector 141, an advertisement database 142 and an advertisement data synthesizer 143.

Based on the conversion function destination data that are received from the command analyzer 110 and the keyword that is received from the keyword extractor 132 of the web page converter 130, the advertisement data selector 141 selects and reads appropriate advertisement data from the advertisement database 142. By referring to the keyword, the field of the contents of the web page 210 to which the advertisement is to be added can be estimated. Thus, a more appropriate advertisement can be provided for a user who browses the web page 210. Furthermore, when the data for designating the conversion function is referred to, a request submitted by the user who is browsing the web page 210 can be understood. That is, when the Japanese-English translation function is selected, it is ascertained that the user browsing the web page desires that all descriptions be given in English, not in Japanese, so that an English advertisement can be inserted. As a result, a more appropriate advertisement can be provided for the user.

The advertisement data synthesizer 143 synthesizes the page data for the web page 150, which is received from the HTML tag synthesizer 135 of the web page converter 130, with advertisement data, which are read by the advertisement data selector 141. Then, so as not to change the layout of the web page 150, the advertisement is added, for example, to the topmost or the lowermost portion of the page. The web page 150 with the added advertisement is generated in this manner, and is returned to the client machine 300 where the function button 220 attached to the web page 210 was clicked on.

In the above example, multiple functions are prepared for the text converter 134 of the web page converter 130, and switching between them is effected by the function switching means 134a. However, a conversion server 100 may be prepared for each conversion function. In this case, since one conversion function is allocated for the web page converter 130 of one conversion server 100, to designate the conversion function, only the desired conversion server 100 need be selected. Thus, the data for designating the conversion function need not be included in the conversion request. Further, since the conversion function type is determined for each conversion server 100, the advertisement data selector 141 of the advertisement insertion unit 140 selects advertisement data based only on the keyword that is received from the web page converter 130.

In addition, for one conversion server 100, multiple web page converters 130 may be provided for corresponding conversion functions, and the conversion process may be performed by the web page converter 130 having a conversion function that is designated by the conversion request. In this case, the advertisement data selector 141 of the advertisement insertion unit 140 determines which web page converter 130 transmitted a keyword, and selects the advertisement data in accordance with the determination results.

Because the conversion server 100 is constituted by the CGI program, in this embodiment, with the above configuration, the server, on which the CGI program of the conversion server 100 is running, is employed to accept the conversion request transmitted to the command analyzer 110 and to return the web page 150 from the advertisement insertion unit 140. Furthermore, when the translation function is selected as the conversion function, currently available machine translation systems not only do not provide superior translations, but also produce many translation errors. Therefore, a message may be added to the web page 150, indicating that a machine translation system was used for the translation.

FIG. 6 is an example script for implementing a function button 220 that is pasted on the web page 210. In FIG. 6, JavaScript is used to implement the function button 220 for the jump to the English-Japanese translation function.

In the script in FIG. 6, the URL http://conversion.ibm.com/cgi-bin/convert?f=(function)&u=(URL of web page currently being browsed)

is generated on the third line "function GO( )". The symbol that is used to designate the conversion function corresponding to the function button 220 is substituted for the "function" in "f=(function)". In the example in FIG. 6, "ej", which is used to designate the English-Japanese translation function, is entered. The use of the symbol "ej" to indicate the English-Japanese translation function is established by the conversion server 100. Further, a function button 220 can be supplied with portions corresponding to each of the conversion functions available from the conversion server 100. Thus, a user who browses the web page 210 need only click on the portion of the function button 220 corresponding to a desired function for that conversion function type to be selected and a conversion request issued.

The seventh line "[Machine Translation E->J]" is the label for a portion of the function button 220 displayed on the web page 210. When the user clicks on this portion, the program jumps to the URL that is generated by "function GO( )". When, for example, the portion "[Machine Translation E->J]" is replaced with "<IMG src=" ej.bmp">" to designate an image file (a bit-mapped file), the title image of "ej.bmp" is displayed on that portion of the function button 220.

When a web page creator inserts the script in FIG. 6 into an arbitrary location in the page data of his or her page 210, he or she can attach, to the web page 210, a function button 220 to be used for a desired function (the English-Japanese translation function in FIG. 6). Since this script is opened to the public on the network, or is included in an application program provided as a web page authoring tool, it can be easily obtained by the web page creator.

The following is a conversion request example that is transmitted by the client machine 300 to the conversion server 100 when the function button 220 in FIG. 6 is clicked on:

http://conversion.ibm.com/cgi-bin/
convert?f=ej&u=http://www.ibm.com/

In the conversion request, the portion "conversion.ibm.com/cgi-bin/convert" represents the location of the conversion server 100. That is, the CGI program "convert" stored in "cgi-bin" at the web server "conversion.ibm.com" is the conversion server 100. The portion "f=ej" designates the conversion function being used. In this example, the "ej" for the English-Japanese translation function corresponding to FIG. 6 is entered. The portion "u=http://www/ibm.com/" designates the URL of the web page 210 that is currently being browsed and that is to be changed by the designated conversion function, i.e., the URL of the web page 210 to which the function button 220 is attached.

Therefore, the above described conversion request submitted to the conversion server 100, "conversion.ibm.com/cgi-bin/convert", requests that the web page 210, for which the URL is "http://www.ibm.com/", be translated from English to Japanese.

When one conversion function is prepared for each conversion server 100, all that is necessary to designate a conversion function type is for the appropriate conversion server 100 to be selected, in which case the portion of the conversion request that is employed for designating the conversion function is not required.

The general processing performed in accordance with this embodiment to convert the web page 210 will now be described.

Figure 7:
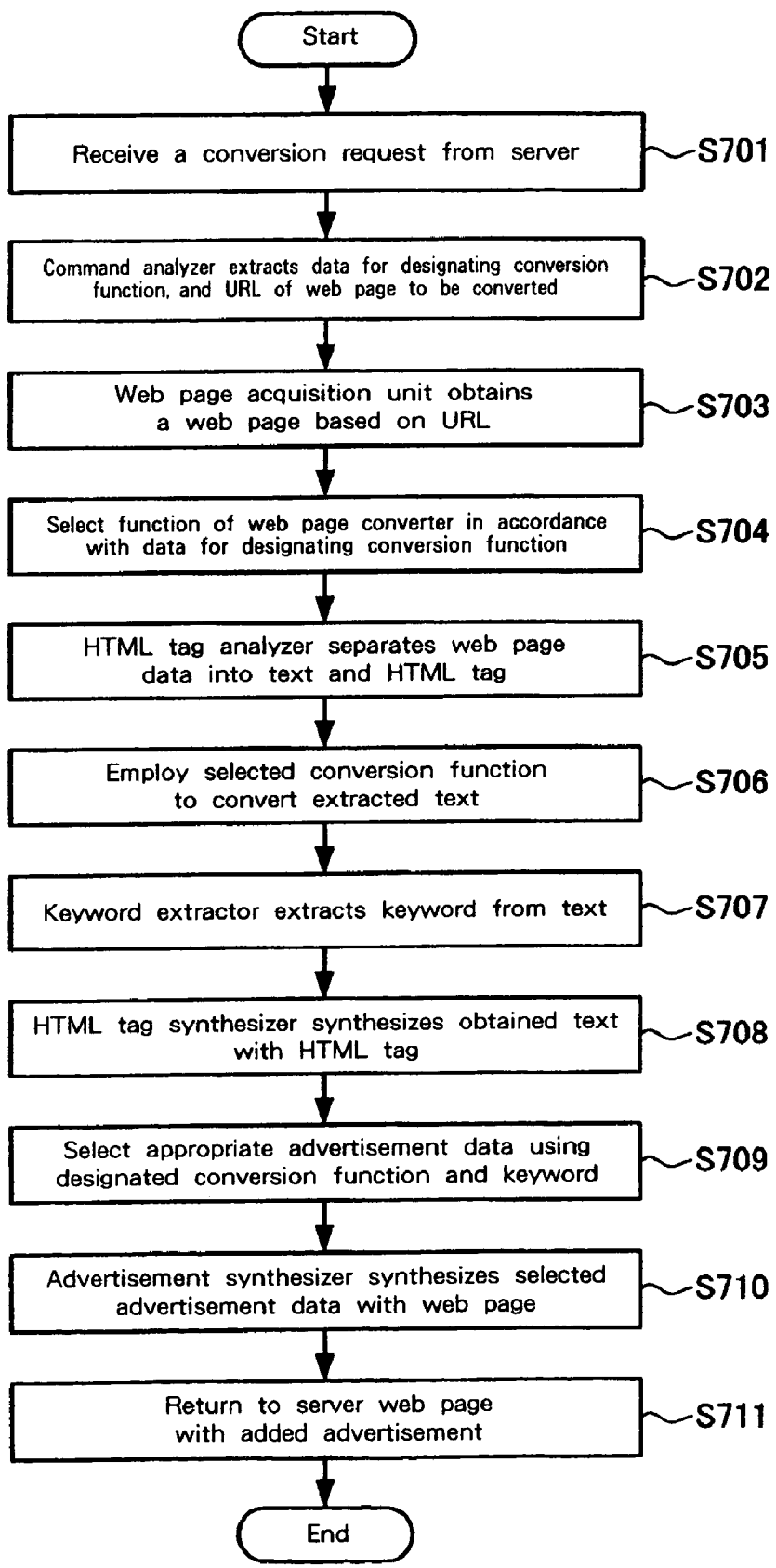
FIG. 7 is a flowchart for explaining the processing performed for the embodiment.
Figure 8:
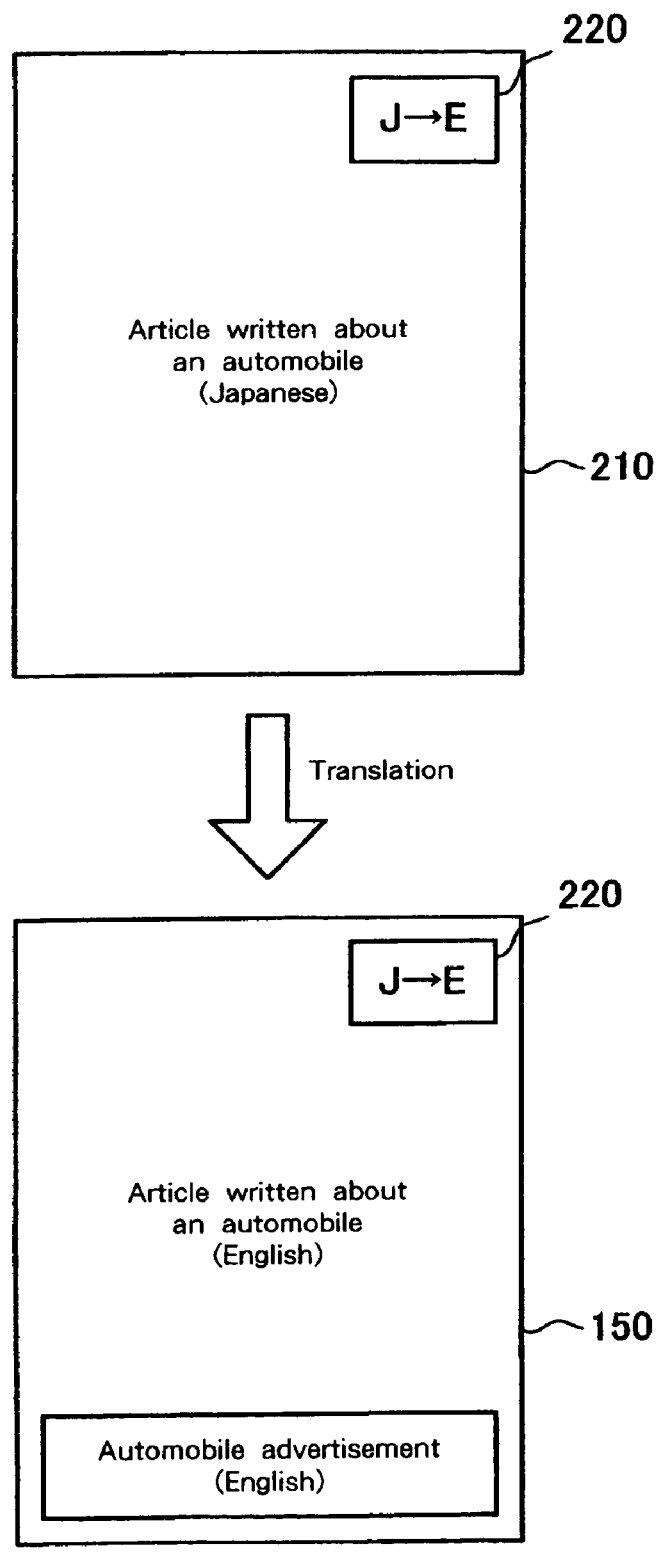
FIG. 8 is a diagram showing the state of a web page before and after a Japanese article written about an automobile is translated into English.

FIG. 7 is a flowchart used to explain the general processing performed for the embodiment, and FIG. 8 is a diagram showing the state of the web page 210 before and after a Japanese article written about an automobile is translated into English. The Japanese-English translation processing performed for this embodiment will now be described while referring to FIGS. 7 and 8.

When the web browser 310 of the client machine 300 displays the web page 210 in FIG. 8, and a function button 220 on the web page 210 is clicked on, a translation request is transmitted to the conversion server 100. In the example in FIG. 8, the J→E function button 220, used to request a Japanese-English translation, is clicked on. Then, the server at which the CGI program is stored, which serves as the conversion server 100, receives the translation request, and activates the appropriate CGI program and transfers the request to it. When the conversion server 100 receives the translation request (step 701), the command analyzer 110 extracts, from the translation request, the data used to designate the translation function, and the URL of the web page 210 to be translated (step 702). The URL is then transmitted to the web page acquisition unit 120, and the data used to designate the translation function are transmitted to the web page converter 130 and to the advertisement insertion unit 140.

Following this, the web page acquisition unit 120 uses the URL that was extracted by the command analyzer 110 to obtain the web page 210, which it then transmits to the web page converter 130 (step 703). Subsequently, the text converter 134 of the web page converter 130 selects a function based on the data used to designate the translation function (step 704), which in this case is the Japanese-English translation function.

The HTML tag analyzer 131 of the web page converter 130 separates the page data for the web page 210 received from the web page acquisition unit 120 into text and the HTML tag (step 705). Then, the text is transmitted to the text converter 134 and the keyword extractor 132, and the HTML tag is transmitted to the HTML tag synthesizer 135.

The text converter 134 translates the Japanese text received from the HTML tag analyzer 131 into English text using the Japanese-English translation function that is selected at step 704 (step 706), and the keyword extractor 132 extracts a keyword from the text received for the HTML tag analyzer 131 (step 707). Thereafter, the extracted keyword is transmitted to the advertisement insertion unit 140.

The HTML tag synthesizer 135 synthesizes the HTML tag received from the HTML tag analyzer 131 with the English text obtained by the text converter 134, and generates the web page 150 (step 708), which it transmits to the advertisement insertion unit 140.

The advertisement data selector 141, of the advertisement insertion unit 140, employs the translation function designation data received from the command analyzer 110 and the keyword received from the keyword extractor 132, of the web page converter 130, to select and read appropriate advertisement data from the advertisement database 142 (step 709). In this case, since an article written about an automobile is carried on the web page 210, a keyword related to automobiles is extracted and the Japanese-English translation function is designated, so that an English language automobile advertisement is selected.

Next, the advertisement data synthesizer 143 synthesizes the web page 150 obtained by the web page converter 130 with the advertisement data selected by the advertisement data selector 141 (step 710). As a result, the web page 150 shown in FIG. 8 is obtained whereon the English translation of the article written about the automobile is carried and the English language automobile advertisement is added. The web page 150 is then returned to the server that is acting as the conversion server 100 (step 711), and from there it is transmitted to the client machine 300 that issued the translation request.

In the above embodiment, the web page 210 for which the function buttons 220 are provided has been employed for conversion. However, other web pages to which the web page 210 link can also be converted. That is, when the web page 210 for which the function buttons 220 are provided is linked with another web page, the page data for the web page 210 that are acquired by the web page acquisition unit 120 are analyzed by the HTML tag analyzer 131, so that the conversion server 100 can obtain the URL at the linking destination. Therefore, if necessary, this URL can be used both to obtain the web page at the linking destination and to convert it.

While the function buttons 220 used for selecting a conversion function are provided for the web page 210, such buttons are not always present on another web page that is linked with the web page 210. In this case, the conversion server 100 need only trace the linkage and convert the different web page. In this manner, a desired conversion can be performed for a web page for which no function buttons 220 are provided, and an even better service can be provided for a user.

In the above embodiment, text data has been converted. However, the technique of the present invention can be extended in the following manner. A server for performing various processes for image data and audio data is prepared, and buttons for such processes are attached to the web page 210. Thus, an image or sounds obtained using a predetermined process can be provided for the client machine 300 where a function button was clicked on.

Furthermore, the functions provided by the conversion server 100 may include processes used for image data, such as a process used for identifying characters included in image data, a process for translating characters that have been identified and a process for changing a color image into a monochrome image, or processes used for audio data, such as a process for identifying audio data to generate a text file and a process for translating the generated text file.

As is described above, according to the present invention, functions for converting a web page are prepared, and upon receipt of a request from a web page creator, one of the functions can be easily utilized for a web page. Further, according to the present invention, a user who is browsing a web page need only perform a simple operation to select a service provided by an added web page function.

The invention claimed is:

1. A network system comprising:
   a client for browsing web pages;
   a server for providing a function to perform a predetermined process for said web pages; and
   a web server for storing a web page that includes a function execution request object which is used to request that a process be performed by said function providing server,
   wherein said client obtains, from said web server, said web page that includes said function execution request object, and when said function execution request object included in said web page is selected, said client designates the storage location for a target web page and transmits a process execution request to said function providing server,
   wherein, upon the receipt of said process execution request from said client, said function providing server obtains said target web page based on said storage location that is designated by said process execution request, performs a pertinent process for said target web page that is obtained, and returns the resultant web page to said client that issued said process execution request,
   wherein the function execution request object is one of a button, a banner, a linking keyword, and an image data.

2. The network system according to claim 1, wherein, when issuing said process execution request, said client designates the type of process to be performed, and said function providing server performs said designated process for an obtained web page.

3. The network system according to claim 1, wherein, when said obtained web page is linked with another web page, said function providing server also obtains a web page at a linking destination and performs a process for said obtained web page.

4. The network system according to claim 1, wherein said function providing server inserts predetermined advertisement contents into said web page obtained by said process.

5. A server, for receiving an execution request from a client and for performing a predetermined function in consonance with said execution request, comprising:
   a command analyzer for, in response to a selection of a function execution request object that is included in a web page displayed by said client and that is used to request that said server execute a process, accepting and analyzing an execution request that is received by said server and that includes information concerning a storage location for a target web page that is to be processed;
   a web page acquisition unit for obtaining said target web page based on said information that is included in said execution request concerning said storage location for said target web page; and
   a web page converter for performing a predetermined conversion process for said target web page that is obtained,
   wherein the function execution request object is one of a button, a banner, a linking keyword, and an image data.

6. The server according to claim 5, further comprising:
   a transmission unit for returning, to said client, the resultant web page obtained by the performance of said conversion process.

7. The server according to claim 5, wherein, when said obtained web page is linked with another web page, said web page acquisition unit also obtains a web page at a linking destination; and wherein said web page converter performs said predetermined conversion process for said web page at said linking destination that is obtained by said web page acquisition unit.

8. The server according to claim 5, further comprising:
   an advertisement insertion unit for inserting predetermined advertisement contents into said web page obtained by said web page converter.

9. The server according to claim 8, wherein said advertisement insertion unit selects for insertion an advertisement content type based on the type of processing that said web page converter performs for said web page.

10. The server according to claim 8, wherein said advertisement insertion unit selects for insertion an advertisement content type based on a keyword that is extracted from said web page.

11. A web server, for storing a web page that is browsed by means of a communication network, comprises:
    a command analyzer for, in response to a selection of a function execution request object that is included in a web page displayed by a client and that is used to request that said web server execute a process, accepting and analyzing an execution request that is received by said web server and that includes information concerning a storage location for a target web page that is to be processed;
    storage means for storing a web page, including both a description of a URL for a function providing server, which performs a translating process for a web page, and a description of an option for obtaining a URL for a web page that is inserted into said web server, the translating process configured to translate, at least in part, the web page from a first language to a second language; and
    communication control means for accepting a request to browse the web page and for returning said web page to the source that transmitted said request.

12. A data processing method for receiving an execution request from a client and for performing a predetermined process in consonance with the execution request comprising the steps of:
    analyzing, in response to a selection of a function execution request object that is included in a web page displayed by said client and that is used to request that said server execute a process, an execution request that is received by said server and that includes information concerning a storage location for a target web page that is to be processed;
    obtaining said target web page based on the information, which is included in said execution request, concerning said storage location for said target web page; and
    performing a predetermined conversion process for said target web page that is obtained;

wherein the predetermined conversion process includes a translating process configured to translate, at least in part, the target web page from a first language to a second language.

13. A storage medium on which input means of a computer stores a computer-readable program, which permits said computer to perform:
- a process for analyzing, in response to a selection of a function execution request object that is included in a web page displayed by said client and that is used to request that a server execute a process, an execution request that is received by said server and that includes information concerning a storage location for a target web page that is to be processed;
- a process for obtaining said target web page based on said information, which is included in said execution request, concerning said storage location for said target web page; and
- a process for performing a predetermined conversion process for said target web page that is obtained; and wherein the function execution request object is one of a button, a banner, a linking keyword, and an image data.

14. The network system according to claim 1, wherein the execution request object includes an indicia of a first language and a second language and the pertinent process includes a translating process to translate, at least in part, the web page from the first language to the second language.

15. The server according to claim 5, wherein the execution request includes an indicia of a first language and a second language and the predetermined conversion process includes a translating process to translate, at least in part, the web page from the first language to the second language.

16. The storage medium according to claim 13, wherein the execution request includes an indicia of a first language and a second language and the predetermined conversion process includes a translating process to translate, at least in part, the target web page from the first language to the second language.

* * * * *